(12) United States Patent
Ash et al.

(10) Patent No.: US 9,095,928 B2
(45) Date of Patent: Aug. 4, 2015

(54) METHOD AND SYSTEM FOR HEATING CONSUMABLE DURING HOT WIRE

(71) Applicant: LINCOLN GLOBAL, INC., City of Industry, CA (US)

(72) Inventors: Elliott Ash, Bay Village, OH (US); William T. Matthews, Chesterland, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 318 days.

(21) Appl. No.: 13/792,270

(22) Filed: Mar. 11, 2013

(65) Prior Publication Data

US 2014/0008334 A1 Jan. 9, 2014

Related U.S. Application Data

(60) Provisional application No. 61/668,845, filed on Jul. 6, 2012.

(51) Int. Cl.
*B23K 26/20* (2014.01)
*B23K 26/42* (2006.01)
(Continued)

(52) U.S. Cl.
CPC . *B23K 26/20* (2013.01); *B23K 9/02* (2013.01); *B23K 9/04* (2013.01); *B23K 9/042* (2013.01); *B23K 9/0671* (2013.01); *B23K 9/1093* (2013.01); *B23K 9/124* (2013.01); *B23K 9/125* (2013.01); *B23K 26/203* (2013.01); *B23K 26/34* (2013.01); *B23K 26/345* (2013.01); *B23K 26/42* (2013.01)

(58) Field of Classification Search
CPC .............. B23K 9/02; B23K 9/04; B23K 9/10; B23K 9/12; B23K 26/20; B23K 26/34; B23K 26/42; B23K 37/06

USPC ............ 219/121.62–121.64, 121.76, 121.77, 219/121.86
See application file for complete search history.

(56) References Cited

U.S. PATENT DOCUMENTS 4,803,334 A * 2/1989 Burke et al. ............. 219/121.64
6,191,379 B1 * 2/2001 Offer et al. ...................... 219/75
(Continued)

FOREIGN PATENT DOCUMENTS

JP 2010167436 A 8/2010

OTHER PUBLICATIONS

International Search Report and Written Opinion for International Application No. PCT/IB2013/001456, mailing date Jan. 3, 2014, 10 pages.

*Primary Examiner* — Samuel M Heinrich
(74) *Attorney, Agent, or Firm* — Perkins Coie LLP

(57) ABSTRACT

A system and method for use in brazing, cladding, building up, filling, overlaying, welding, and joining applications is provided. The system includes a first laser beam system which directs a first laser beam at a surface of at least one workpiece to create a molten puddle on the surface and a wire feeder which advances a consumable to the molten puddle so that the consumable contacts the molten puddle. The system also includes a power supply which outputs a heating signal and the heating signal is directed to the consumable to heat the consumable prior to the consumable entering the puddle. The system further includes a second laser beam system which directs a second laser beam at the consumable prior to the consumable entering the puddle and a controller which controls an output of each of the power supply and the second laser beam system.

20 Claims, 5 Drawing Sheets

(51) Int. Cl.
*B23K 26/30* (2014.01)
*B23K 9/02* (2006.01)
*B23K 9/04* (2006.01)
*B23K 9/067* (2006.01)
*B23K 9/10* (2006.01)
*B23K 9/12* (2006.01)
*B23K 26/34* (2014.01)

(56) References Cited

U.S. PATENT DOCUMENTS

2011/0042361 A1\* 2/2011 Nowak et al. ............ 219/121.64
2011/0215074 A1 9/2011 Wang et al.
2011/0297658 A1\* 12/2011 Peters et al. .................. 219/162
2013/0213942 A1 8/2013 Peters et al.

\* cited by examiner

METHOD AND SYSTEM FOR HEATING CONSUMABLE DURING HOT WIRE

PRIORITY

The present application claims priority to U.S. Provisional Patent Application No. 61/668,845, which is incorporated herein by reference in its entirety.

TECHNICAL FIELD

Certain embodiments relate to filler wire brazing, cladding, building up, filling, hard-facing overlaying, welding, and joining applications. More particularly, certain embodiments relate to a system and method that uses a laser to heat filler wire in a system for any of brazing, cladding, building up, filling, hard-facing overlaying, joining, and welding applications.

BACKGROUND

The traditional filler wire method of welding (e.g., a gas-tungsten arc welding (GTAW) filler wire method) can provide increased deposition rates and welding speeds over that of traditional arc welding alone. In such welding operations, the filler wire, which leads a torch, can be resistance-heated by a separate power supply. The wire is fed through a contact tube toward a workpiece and extends beyond the tube. The extension is resistance-heated to aid in the melting of the filler wire. A tungsten electrode may be used to heat and melt the workpiece to form the weld puddle. A power supply provides a large portion of the energy needed to resistance-melt the filler wire. In some cases, the wire feed may slip or falter and the current in the wire may cause an arc to occur between the tip of the wire and the workpiece. The extra heat of such an arc may cause burnthrough and spatter resulting in poor weld quality.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and method to use a laser to heat at least one filler wire in a system for any of brazing, cladding, building up, filling, hard-facing overlaying, welding, and joining applications. In some embodiments, the system includes a first laser beam system which directs a first laser beam at a surface of at least one workpiece to create a molten puddle on the surface and a wire feeder which advances a consumable to the molten puddle so that the consumable contacts the molten puddle. The system also includes a power supply which outputs a heating signal and the heating signal is directed to the consumable to heat the consumable prior to the consumable entering the puddle. The system further includes a second laser beam system which directs a second laser beam at the consumable prior to the consumable entering the puddle and a controller which controls an output of each of the power supply and the second laser beam system. The controller monitors at least one of a voltage at, current through, resistance of, and temperature of the consumable and controls an output of at least one of the second laser beam system and the power supply based on the monitoring so that the consumable melts in the molten puddle without generation of an arc between the consumable and the molten puddle.

In some embodiments, the method includes directing a first laser beam at a surface of at least one workpiece to create a molten puddle on said surface and advancing a consumable to said molten puddle so that said consumable contacts said molten puddle. The method also includes directing a heating signal to said consumable to heat said consumable prior to said consumable entering said puddle and directing a second laser beam at said consumable prior to said consumable entering said puddle. The method further includes monitoring at least one of a voltage at, current through, resistance of, and temperature of said consumable and controlling a power of at least one of said second laser beam and said heating signal based on said monitoring so that said consumable melts in said molten puddle without generation of an arc between said consumable and said molten puddle.

The method can also include applying energy from a high intensity energy source to the workpiece to heat the workpiece at least while using a laser to heat the at least one filler wire. The high intensity energy source may include at least one of a laser device, a plasma arc welding (PAW) device, a gas tungsten arc welding (GTAW) device, a gas metal arc welding (GMAW) device, a flux cored arc welding (FCAW) device, and a submerged arc welding (SAW) device.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
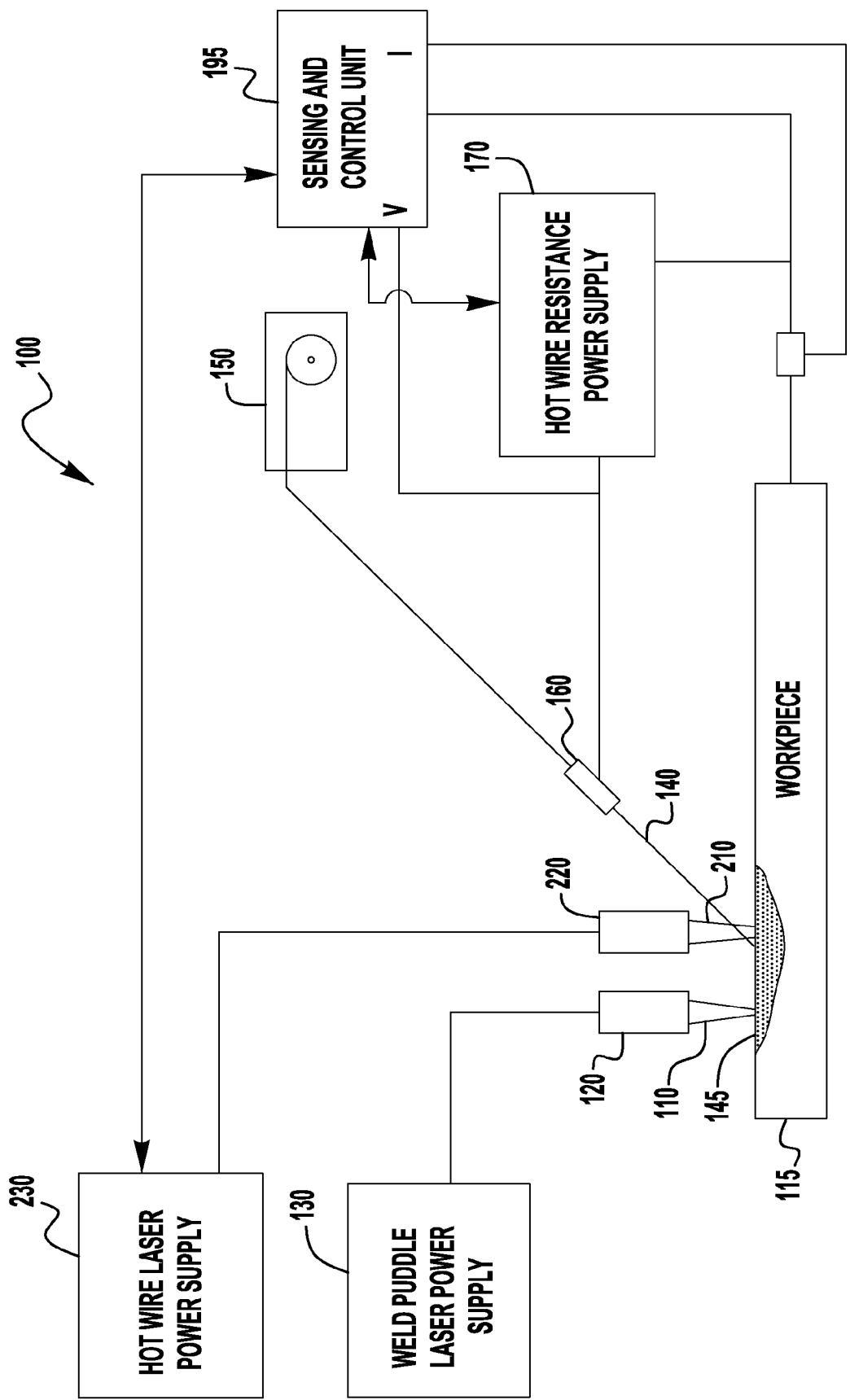
FIG. 1 illustrates a functional schematic block diagram of an exemplary embodiment of a combination filler wire feeder and energy source system for any of brazing, cladding, building up, filling, hard-facing overlaying, welding, and joining applications.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It is known that welding/joining operations typically join multiple workpieces together in a welding operation where a filler metal is combined with at least some of the workpiece metal to form a joint. Because of the desire to increase production throughput in welding operations, there is a constant need for faster welding operations, which do not result in welds which have a substandard quality. This is also true for cladding/surfacing operations, which use similar technology. It is noted that although much of the following discussions will reference "welding" operations and systems, embodiments of the present invention are not just limited to joining operations, but can similarly be used for cladding, brazing, overlaying, etc.—type operations. Furthermore, there is a need to provide systems that can weld quickly under adverse environmental conditions, such as in remote work sites. As described below, exemplary embodiments of the present invention provide significant advantages over existing welding technologies. Such advantages include, but are not limited to, reduced total heat input resulting in low distortion of the workpiece, very high welding travel speeds, very low spatter rates, welding with the absence of shielding, welding plated or coated materials at high speeds with little or no spatter and welding complex materials at high speeds.

FIG. 1 illustrates a functional schematic block diagram of an exemplary embodiment of a combination filler wire feeder and energy source system 100 for performing any of brazing, cladding, building up, filling, hard-facing overlaying, and joining/welding applications. The system 100 includes a high energy heat source capable of heating the workpiece 115 to form a weld puddle 145. The high energy heat source can be a laser subsystem 130/120 that includes a laser device 120 and a weld puddle laser power supply 130 operatively connected to each other. The laser 120 is capable of focusing a laser beam 110 onto the workpiece 115 and the power supply 130 provides the power to operate the laser device 120. The laser subsystem 130/120 can be any type of high energy laser source, including but not limited to carbon dioxide, Nd:YAG, Yb-disk, YB-fiber, fiber delivered, or direct diode laser systems. Further, even white light or quartz laser type systems can be used if they have sufficient energy. For example, a high intensity energy source can provide at least 500 W/cm$^2$.

The following specification will repeatedly refer to the laser subsystem 130/120, beam 110 and weld puddle laser power supply 130, however, it should be understood that this reference is exemplary as any high intensity energy source may be used. For example, other embodiments of the high energy heat source may include at least one of an electron beam, a plasma arc welding subsystem, a gas tungsten arc welding subsystem, a gas metal arc welding subsystem, a flux cored arc welding subsystem, and a submerged arc welding subsystem. It should be noted that the high intensity energy sources, such as the laser device 120 discussed herein, should be of a type having sufficient power to provide the necessary energy density for the desired welding operation. That is, the laser device 120 should have a power sufficient to create and maintain a stable weld puddle throughout the welding process, and also reach the desired weld penetration. For example, for some applications, lasers should have the ability to "keyhole" the workpieces being welded. This means that the laser should have sufficient power to fully penetrate the workpiece, while maintaining that level of penetration as the laser travels along the workpiece. Exemplary lasers should have power capabilities in the range of 1 to 20 kW, and may have a power capability in the range of 5 to 20 kW. Higher power lasers can be utilized, but can become very costly.

The system 100 also includes a hot filler wire feeder subsystem capable of providing at least one filler wire 140 to make contact with the workpiece 115 in the vicinity of the laser beam 110. Of course, it is understood that by reference to the workpiece 115 herein, the molten puddle, i.e., weld puddle 145 is considered part of the workpiece 115, thus reference to contact with the workpiece 115 includes contact with the weld puddle 145. The hot filler wire feeder subsystem includes a filler wire feeder 150, contact tube 160, a hot wire resistance power supply 170, and a hot wire laser subsystem 230/220. The hot wire laser subsystem includes a laser 220 which is powered by hot wire laser power supply 230. The hot wire laser subsystem 230/220 can be any type of high energy laser source, including but not limited to carbon dioxide, Nd:YAG, Yb-disk, YB-fiber, fiber delivered or direct diode laser systems. Again, even white light or quartz laser type systems can be used if they have sufficient energy.

During operation, the wire 140 is fed from the filler wire feeder 150 toward the workpiece 115 and extends beyond contact tube 160. Prior to its entry into weld puddle 145 on the workpiece 115, the extended portion of filler wire 140 is heated by laser beam 210 from laser 220 such that wire 140 approaches or reaches its melting point before contacting the weld puddle 145. Unlike most welding processes, the present invention melts the filler wire 140 into the weld puddle 145 rather than using a welding arc to transfer the filler wire 140 into the weld puddle 145. Because the filler wire 140 is heated to at or near its melting point by laser beam 210, its presence in the weld puddle 145 will not appreciably cool or solidify the puddle 145 and the wire 140 is quickly consumed into the weld puddle 145.

In some exemplary embodiments, the wire 140 is preheated to a predetermined threshold temperature by hot wire resistance power supply 170. Power supply 170 sends a current through the wire 140 via contact tube 160 and the current resistance heats the extended portion of the wire 140 to the predetermined threshold temperature. In some non-limiting embodiments, the threshold temperature is selected such that the current needed to maintain the wire 140 at the threshold temperature will not create an arc if the wire 140 loses contact with the workpiece 115. Accordingly, because the current from resistance power supply 170 is below the level for arc creation, the possibility of inadvertently forming an arc between the wire 140 and the workpiece 115 is nearly zero. As the filler wire 140 is fed to the weld puddle 145, at least a portion of the wire 140 that extends beyond contact tube 160 is then heated to at or near its melting point by the laser beam 210. Because many filler wires are made of materials which can be reflective, preheating the wire 140 using current from the power supply 170 as discussed above will reduce the wire's surface reflectivity and allow the laser beam 210 to contribute to the heating/melting of the wire 140. In some exemplary embodiments, the function of preheating the wire 140 is incorporated into the laser power supply 230 rather than in a separate power supply.

Of course, the melting temperature of the filler wire 140 will vary depending on the size and chemistry of the wire 140. Accordingly, the desired temperature of the filler wire during welding will vary depending on the wire 140. As will be further discussed below, the desired operating temperature for the filler wire 140 can be a data input into the welding system so that the desired wire temperature is maintained during welding. In any event, the temperature of the wire 140 should be such that the wire 140 is consumed into the weld puddle 145 during the welding operation. In exemplary embodiments, at least a portion of the filler wire 140 is solid as it enters the weld puddle 145. For example, at least 30% of the filler wire 140 is solid as the filler wire 140 enters the weld puddle 145.

Because no welding arc is needed to transfer the filler wire in the process described herein, the feeder subsystem may be capable of simultaneously providing one or more wires, in accordance with certain other embodiments of the present invention. For example, a first wire may be used for hardfacing and/or providing corrosion resistance to the workpiece, and a second wire may be used to add structure to the workpiece. In addition, by directing more than one filler wire to any one weld puddle, the overall deposition rate of the weld process can be significantly increased without a significant increase in heat input. Thus, it is contemplated that open root weld joints can be filled in a single weld pass.

As described above, the filler wire 140 impacts the same weld puddle 145 as the laser beam 110. In some exemplary embodiments, the filler wire 140 can impact the same weld puddle 145 remotely from the laser beam 110. However, in other exemplary embodiments, the filler wire 140 impacts the weld puddle 145 at the same location as the laser beam 110. In this case, the laser beam 110, which serves to melt some of the workpiece 115 to from the weld puddle 145, may also aid laser beam 210 in melting the filler wire 140. Additionally, in some non-limiting embodiments, the weld puddle 145 will help melt the filler wire 140. While the laser 120 and power supply 170 may provide some energy to melt the wire 140 in some exemplary embodiments of the present invention, the laser 220 will provide a large portion of the energy needed to melt the filler wire 140. In some non-limiting embodiments, the laser beam 210 may provide greater than 50% of the energy needed to melt filler wire 140. However, in other exemplary embodiments, the heating current may provide greater than 50% of the energy needed to melt the filler wire 140.

In exemplary embodiments of the present invention, the wire heating laser beam 210 is configured and directed such that it only impacts the wire 140 during operation and does not add any additional heat to the puddle 145 during the operation. In these embodiments, the beam 210 is emitted at a cross-sectional shape and focus such that the beam 210 does not impact the puddle. For example, the beam 210 can have a cross-sectional shape—at the point of impact on the wire 140—which has a maximum width (in a direction normal to the centerline of the wire) in the range of 50 to 90% of the diameter of the wire 140. Such a cross-sectional dimension ensures that none of the beam 210 energy impacts the puddle.

In the embodiment shown in FIG. 1, the filler wire 140 trails the laser beam 110 during the welding operation. However, that is not necessary as the filler wire 140 can be positioned in the leading position. The present invention is not limited in this regard, as the filler wire 140 can be positioned at other positions relative to the beam 110 so long as the filler wire 140 impacts the same weld puddle 145 as the beam 110.

The system 100 may include a sensing and control unit 195 which is operatively connected to the workpiece 115 and to filler wire 140 via sensing tube 160. In some embodiments of the present invention, the sensing and control unit 195 is capable of measuring a resistance and/or a potential difference (i.e., a voltage V) between a predetermined point on the filler wire 140 (for example, location of sensing tube 160) and the workpiece 115 and/or a current flowing through the wire 140. In addition, the sensing and control unit 195 is capable of sensing when the filler wire 140 is in contact with the workpiece 115 prior to starting the welding process, including starting lasers 120 and 220 and the preheating current through the wire 140 from the power supply 170. Application Ser. No. 13/212,025, titled "Method And System To Start And Use Combination Filler Wire Feed And High Intensity Energy Source For Welding" and incorporated by reference in its entirety, provides exemplary startup control algorithms that may be incorporated in sensing and control unit 195 for sensing when wire 140 is in contact with the workpiece 115.

Once the welding process has started, the sensing and control unit 195 is operatively connected to the hot wire laser power supply 230 to be further capable of controlling the laser 220 in response to the sensing. Based on the voltage, current, and/or resistance measurements, the sensing and control unit 195 can adjust the power from the laser 220 and/or the power supply 170 to ensure that the wire 140 is not melting too quickly or too late in the wire feed process. Such sensing may be accomplished by a premonition circuit within the sensing and control unit 195 measuring a rate of change of one of a potential difference between (dv/dt), a current through (di/dt), a resistance between (dr/dt), or a power through (dp/dt) the filler wire 140 and the workpiece 115. The rate of change of these parameters can provide an indication of how fast (or slow) the wire 140 is being heated. For example, during the welding operation, the sensing and control unit 195 can sense whenever the distal end of filler wire 140 is about to lose contact with the workpiece 115 (i.e., melting the wire 140 too quickly). When the rate of change exceeds a predefined value, the sensing and control unit 195 formally predicts that loss of contact is about to occur. Such premonition circuits are well known in the art for arc welding. In addition, application Ser. No. 13/212,025, titled "Method And System To Start And Use Combination Filler Wire Feed And High Intensity Energy Source For Welding" and incorporated by reference in its entirety, provides exemplary premonition control algorithms that may be incorporated in sensing and control unit 195. In exemplary embodiments, the premonition circuit may be used to control laser beam 210 and/or power supply 170.

For example, when the distal end of the wire 140 becomes highly molten due to heating, the distal end may begin to pinch off from the wire 140 onto the workpiece 115. At that time, the potential difference or voltage increases because the cross section of the distal end of the wire decreases rapidly as it is pinching off. Therefore, by measuring such a rate of change, the sensing and control unit 195 may anticipate when the distal end is about to pinch off and lose contact with the workpiece 115. Also, if contact is fully lost, a potential difference (i.e., a voltage level) which is significantly greater than zero volts may be measured by the sensing and control unit 195. When the sensing and control unit 195 determines that contact is about to be lost, the control unit 195 commands the hot wire laser power supply 230 to reduce the heat delivered by the laser 220 to the hot wire 140. Of course, in other embodiments, the preheating current to the wire 140 may also be reduced or shut off.

Figure 2:
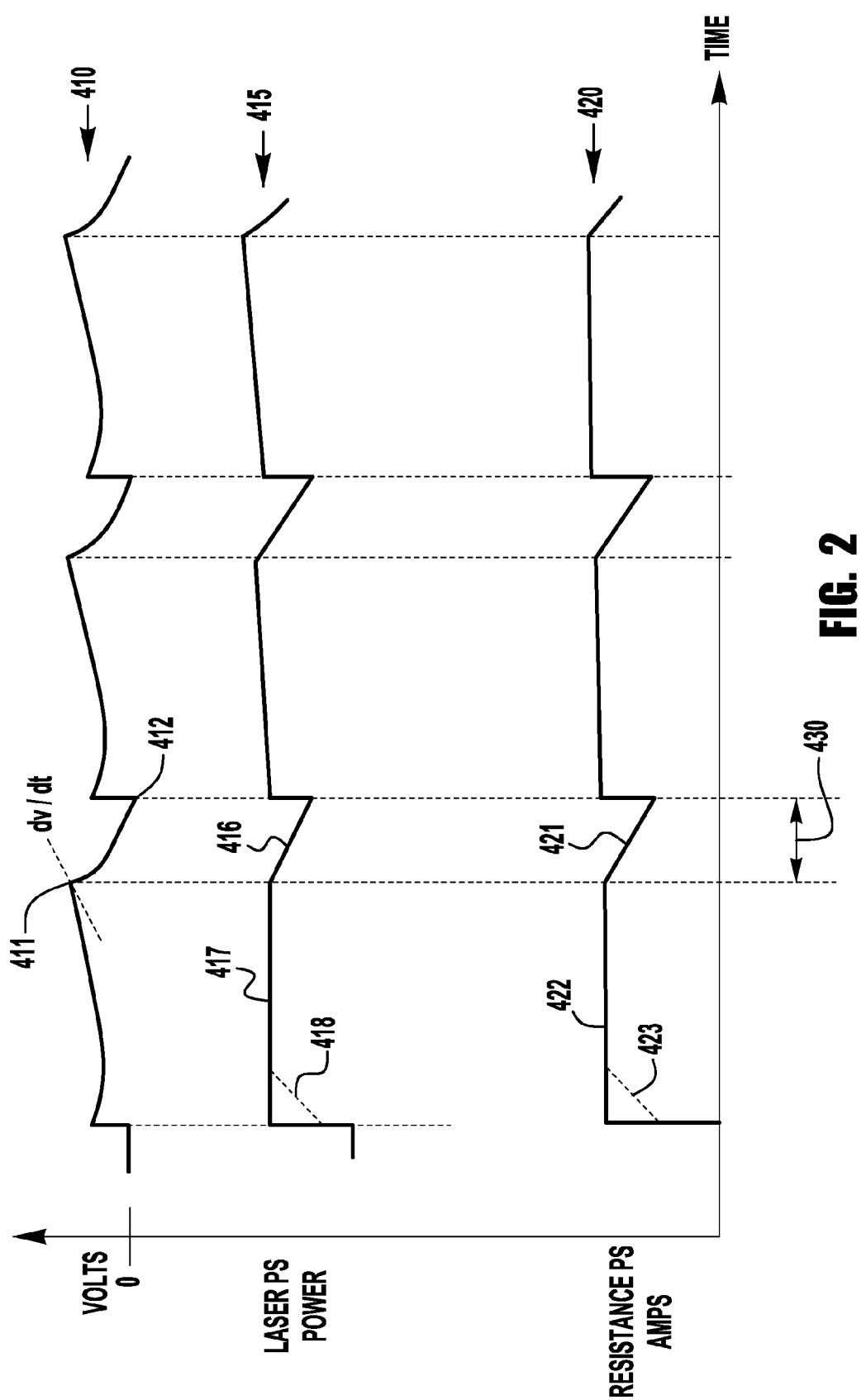
FIG. 2 illustrates an exemplary embodiment of voltage, power, and current waveforms associated with the system of FIG. 1.

For example, FIG. 2 illustrates an exemplary embodiment of voltage, power and current waveforms 410, 415, and 420, respectively. The voltage waveform 410 is measured by the sensing and control unit 195 between a predetermined point on filler wire 140 (for example, at contact tube 160) and the workpiece 115. The power waveform 415 is that of the laser 220. The current waveform 420 through the wire 140 is measured by the sensing and control unit 195 and can be that of the resistance power supply 170 (or, in some embodiments, from power supply 230).

Whenever the distal end of the filler wire 140 is about to lose contact with the workpiece 115, the rate of change of the voltage waveform 410 (i.e., dv/dt) will exceed a predetermined threshold value, indicating that pinch off is about to occur (see the slope at point 411 of the waveform 410). As alternatives, a rate of change of current through (di/dt), a rate of change of resistance between (dr/dt), or a rate of change of power through (dp/dt) the filler wire 140 and the workpiece 115 may instead be used to indicate that pinch off is about to occur. Such rate of change premonition techniques are well known in the art. At that point in time, the sensing and current controller 195 will reduce the heat input to the wire 140 by reducing the power from power supply 230 (portion 416) to laser beam 210 and/or by reducing the preheating current from power supply 170 (portion 421). In some exemplary embodiments, the power from power supply 230 and/or the preheating current from power supply 170 may be shut off. In other exemplary embodiments, the preheating current will remain constant and only the power to laser 220 will be controlled (reduced or shut off) in response to the sensing and control unit 195.

When the sensing and current controller 195 senses that the distal end of the filler wire 140 is once again making good contact with the workpiece 115 after some time interval 430 (e.g., the voltage level drops back to about zero volts at point 412), the sensing and control unit 195 commands the power supply 230 to increase the power to laser beam 210 (portion 417) and/or the preheating current from power supply 170 (portion 422). In accordance with an embodiment of the present invention, the power from power supply 230 and/or the current from the power supply 170 is ramped up (see portions 418 and 423, respectively). In this manner, contact between the distal end of the wire 140 and the workpiece 115 is largely maintained and the deposition of filler wire 140 onto the workpiece 115 is not interrupted.

Thus, the laser system 220/230 and the hot wire system 170/160 work together to provide the desired total energy or heat input into the wire 140 to provide effective melting of the filler 140 without arcing. That is, in some exemplary embodiments the sensing and control unit 195 can determine a total energy or heat input desired for a specified operation and then allocate the appropriate heat/energy input from each respective system. For example, it can be determined that between 75 and 95% of the desired heat or energy input to the filler 140 is to be provided by the power supply 170, while the remainder of the desired energy/heat to be provided to the filler 140 is to come from the laser 220 and beam 210. This allows the laser 220 to provide the "fine tuning" of heat/energy input and let's the power supply provide the bulk of the heat/energy, which means that a less powerful laser 220 is needed while the system 100 still achieves improved operations. Thus, the control unit 195 can set a heat or energy input parameter based on user input and then allocate an appropriate proportion of that energy/heat to each of the power supplies 170 and 230 such that optimized performance can be achieved.

Figure 3:
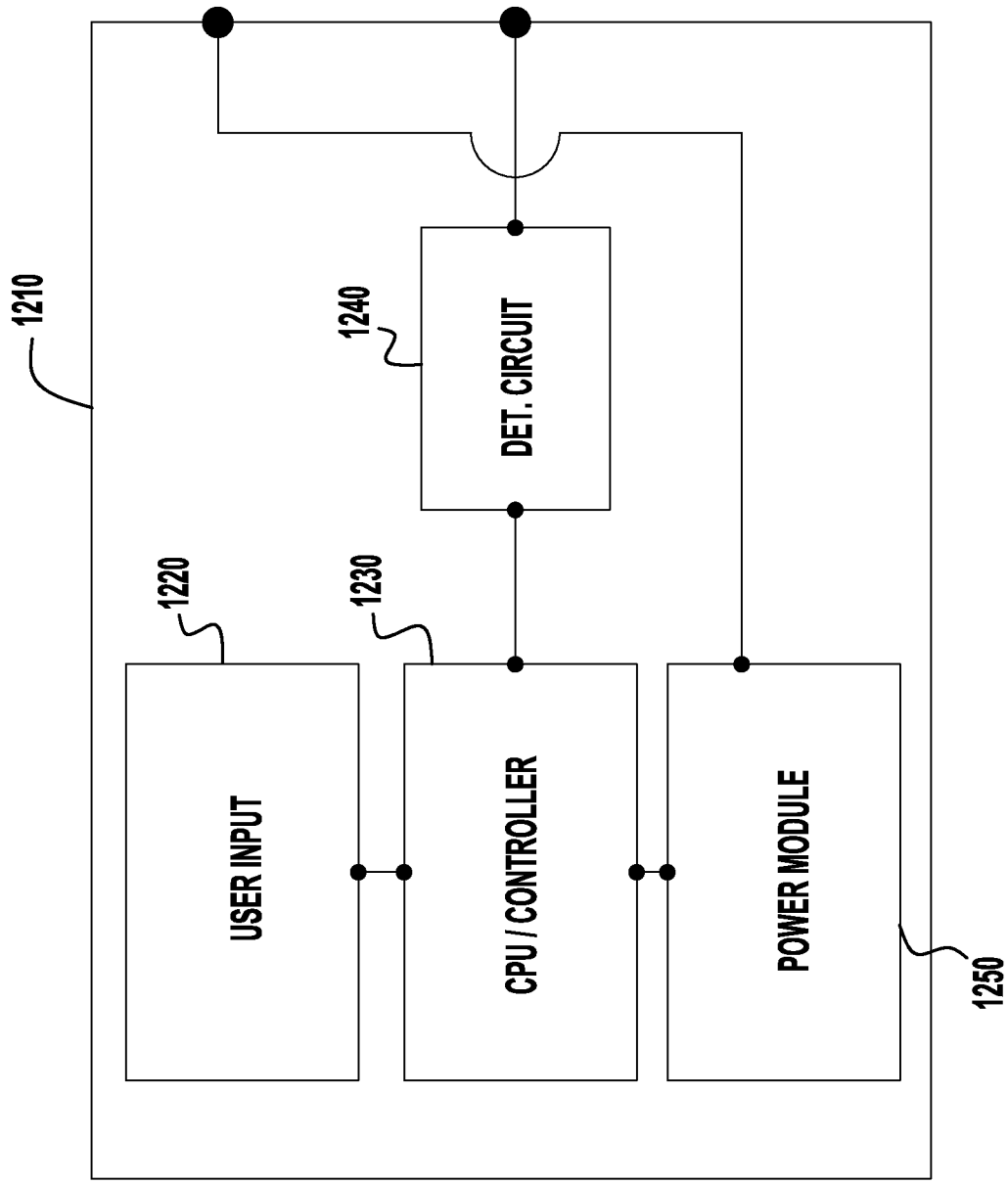
FIG. 3 illustrates an exemplary embodiment of a power supply that can be used in the embodiments of the present invention.

FIG. 3 illustrates another embodiment of a hot wire laser power supply 1210, which can be of a type similar to that shown as power supply 230 in FIG. 1. The power supply 1210 contains a user input 1220 which allows a user to input data including, but not limited to, wire feed speed, wire type, wire diameter, a desired power level, a desired preheating current level, and a desired wire temperature. Of course, other input parameters can be utilized as needed. The user interface 1220 is coupled to a CPU/controller 1230 which receives the user input data and uses this information to create the needed operational set points or ranges for the power module 1250.

The CPU/controller 1230 can determine the desired operational parameters in any number of ways, including using a lookup table. In such an embodiment, the CPU/controller 1230 utilizes the input data, for example, wire feed speed, wire diameter, preheating current, and wire type to determine the desired power output of the laser 220 to appropriately heat the wire 140. This is because the needed power from the laser 220 to heat the wire 140 to the appropriate temperature will be based on at least the input parameters. That is, an aluminum wire may have a lower melting temperature than a mild steel electrode, and thus requires less power to melt the wire. Additionally, a smaller diameter wire will require less power than a larger diameter electrode. Also, as the wire feed speed increases (and accordingly the deposition rate) the needed power level to melt the wire will be higher. In some exemplary embodiments, CPU/controller 1230 can determine the desired preheating current level for the wire 140.

Power supply 1210 may also include detection circuit 1240 which, in combination with CPU/controller 1230, can have a similar construction and operation as the sensing and control unit 195 discussed above and shown in FIG. 1. In exemplary embodiments of the present invention, the sampling/detection rate is at least 10 KHz. In other exemplary embodiments, the detection/sampling rate is in the range of 100 to 200 KHz.

Figure 4:
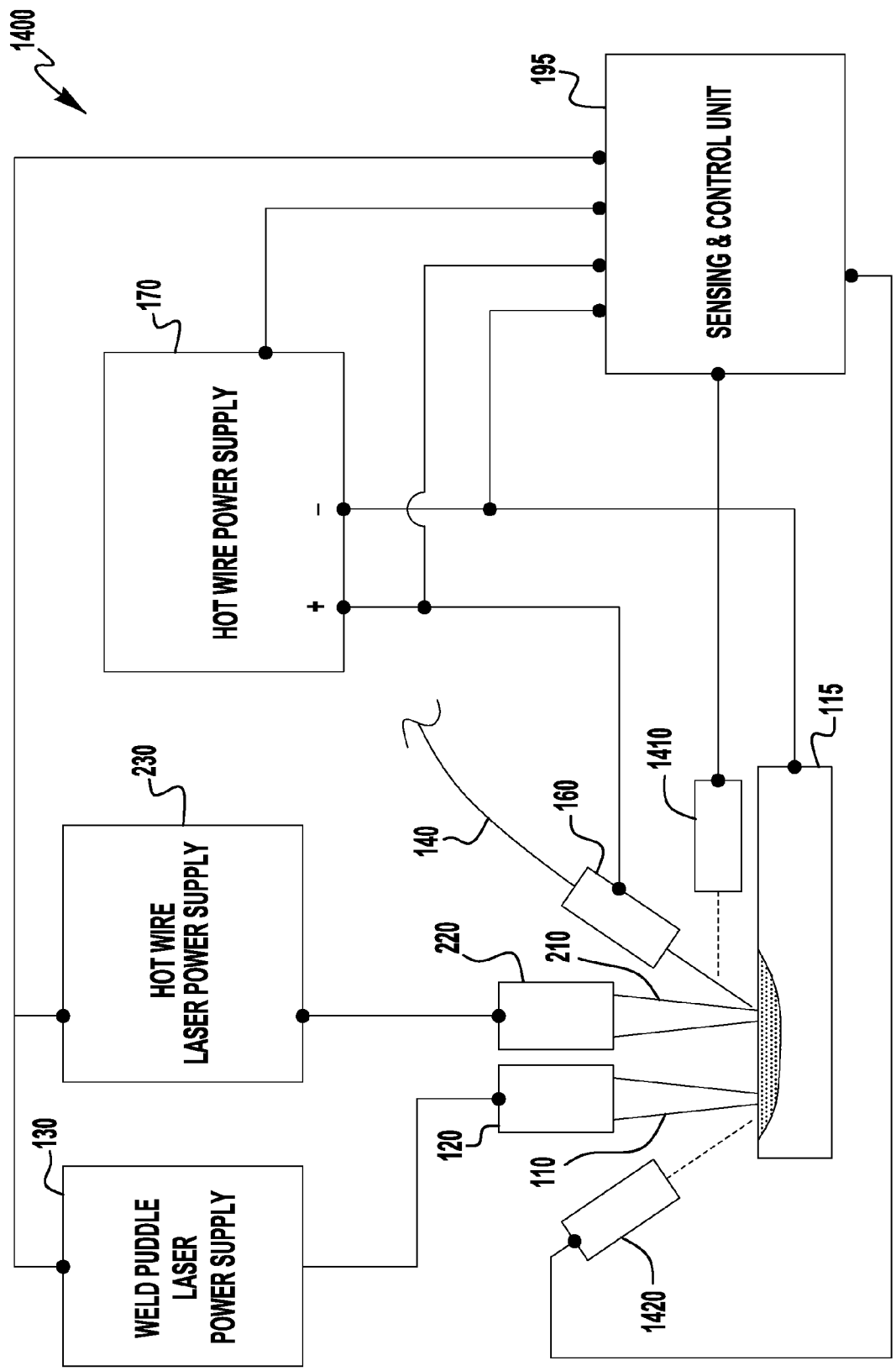
FIG. 4 illustrates a functional schematic block diagram of an exemplary embodiment of a combination filler wire feeder and energy source system for any of brazing, cladding, building up, filling, hard-facing overlaying, welding, and joining applications.

FIG. 4 depicts yet another exemplary embodiment of the present invention. FIG. 4 shows an embodiment similar to that as shown in FIG. 1. However, certain components and connections are not depicted for clarity. FIG. 4 depicts a system 1400 in which a thermal sensor 1410 is utilized to monitor the temperature of the wire 140. The thermal sensor 1410 can be of any known type capable of detecting the temperature of the wire 140. The sensor 1410 can make contact with the wire 140 or of a type which uses a laser or infrared beam that is capable of detecting the temperature of a small object—such as the diameter of a filler wire—without contacting the wire 140. In such an embodiment the sensor 1410 is positioned such that the temperature of the wire 140 can be detected at the stick out of the wire 140—that is at some predetermined point prior on wire 140. The sensor 1410 should also be positioned such that the sensor 1410 for the wire 140 does not sense the temperature of the weld puddle 145.

The sensor 1410 is coupled to the sensing and control unit 195 (discussed with regard to FIG. 1) such that temperature feed back information can be provided to the power supply 230 and/or the laser power supply 130 so that the control of the system 1400 can be optimized. For example, the power output of the power supply 230 can be adjusted based on at least the feedback from the sensor 1410. That is, in an embodiment of the present invention either the user can input a desired temperature setting (for a given weld and/or wire) or the sensing and control unit 195 can set a desired temperature based on other user input data (wire feed speed, filler wire type, electrode type, etc.) and then the sensing and control unit 195 would control at least the power supply 230 to maintain that desired temperature.

In such an embodiment it is possible to account for heating of the wire 140 that may occur due to the laser beam 110 impacting on the wire 140 before the wire enters the weld puddle 145. In embodiments of the invention the temperature of the wire 140 can be controlled only via power supply 230 by controlling power of the laser beam 210 on the wire 140. However, in other embodiments, sensing and control unit 195 may also control the power supply 170 to maintain the desired temperature. Further, in still other embodiments, at least some of the heating of the wire 140 can come from the laser beam 110 impinging on at least a part of the wire 140. As such, the power from the power supply 230 alone may not be representative of the temperature of the wire 140. Accordingly, utilization of the sensor 1410 can aid in regulating the temperature of the wire 140 through control of the power supply 230 and/or the laser power supply 130.

In a further exemplary embodiment (also shown in FIG. 4) a temperature sensor 1420 is directed to sense the temperature of the weld puddle 145. In this embodiment the temperature of the weld puddle is also coupled to the sensing and control unit 195. The sensing and control unit 195 may control the laser power supply 230 and/or the laser power supply 130 based on feedback from the sensor 1420 of the temperature of the weld puddle 145.

In an exemplary embodiment of the present invention, during normal operation, the sensing and control unit 195 maintains at least a portion of the filler wire 140 at a temperature at or above 75% of its melting temperature. For example, when using a mild steel filler wire, the temperature of the wire before it enters the puddle can be approximately 1,600° F., whereas the wire has a melting temperature of about 2,000° F. Of course, it is understood that the respective melting temperatures and desired operational temperatures will varying on at least the alloy, composition, diameter and feed rate of the filler wire. In another exemplary embodiment, the control unit 195 maintains a portion of the filler wire 140 at a temperature at or above 90% of its melting temperature. In further exemplary embodiments, portions of the wire 140 are maintained at a temperature of the wire which is at or above 95% of its melting temperature. It is desirable to have the hottest temperature of the wire 140 at or near the point at which the wire enters the puddle 145 to facilitate efficient melting of the wire 140. Thus, the temperature percentages stated above are to be measured on the wire 140 at or near the point at which the wire 140 enters the puddle 145. By maintaining the filler wire 140 at a temperature close to or at its melting temperature the wire 140 is easily melted into or consumed into the weld puddle 145 created by the heat source/laser 120. That is, the wire 140 is of a temperature which does not result in significantly quenching the weld puddle 145 when the wire 140 makes contact with the puddle 145. Because of the high temperature of the wire 140, the wire 140 melts quickly when it makes contact with the weld puddle 145. It is desirable to have the wire temperature such that the wire 140 does not bottom out in the weld pool—make contact with the non-melted portion of the weld pool. Such contact can adversely affect the quality of the weld.

In another exemplary embodiment of the present invention, the sensing and control unit 195 can be coupled to a feed force detection unit (not shown) which is coupled to the wire feeding mechanism (not shown—but see 150 in FIG. 1). The feed force detection units are known and detect the feed force being applied to the wire 140 as it is being fed to the workpiece 115. For example, such a detection unit can monitor the torque being applied by a wire feeding motor in the wire feeder 150. If the wire 140 passes through the molten weld puddle without fully melting it will contact a solid portion of the workpiece and such contact will cause the feed force to increase as the motor is trying to maintain a set feed rate. This increase in force/torque can be detected and relayed to the control unit 195 which utilizes this information to adjust the power from laser 220 to the wire 140 to ensure proper melting of the wire 140 in the weld puddle 145.

Figure 5:
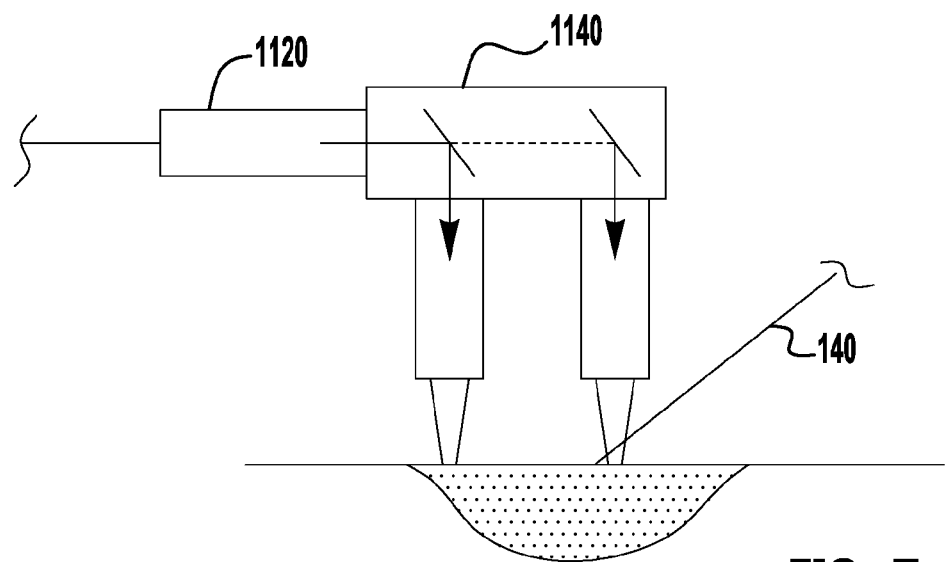
FIG. 5 is an exemplary embodiment of a laser that can be used in the embodiments of the present invention.
Figure 6:
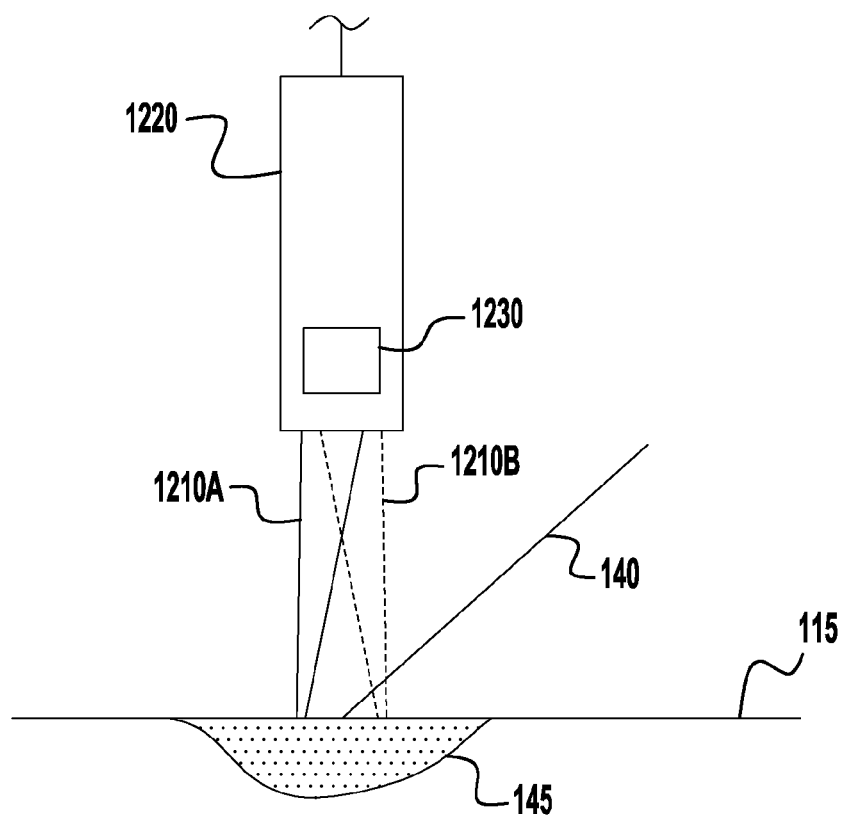
FIG. 6 is an exemplary embodiment of a laser that can be used in the embodiments of the present invention.

The above illustrative embodiments use a laser 120 to form the weld puddle 145 and a laser 220 to heat the filler wire 140. Of course, formation of the weld puddle 145 and heating of the filler wire 140 can also be accomplished with the utilization of a single laser device—for example, laser 1120 and laser optics 1140, which can include a beam splitter, as shown in FIG. 5. However, some of the flexibility may be limited with the use of the single laser source. In addition, as shown in FIG. 6, in some non-limiting embodiments, a single laser 1220 can oscillate its beam using the appropriate optics 1230 to form laser beams 1210A and 1210B. Laser beams 1210A and 1210B respectively form the weld puddle 145 and heat the wire 140. In such embodiments, the focus and intensity of the laser beams 1210A and 1210B can also be oscillated to respectively match the requirements of the workpiece 115 and the filler wire 140. Further, the present invention is not limited to either a single or double laser configuration, as it is contemplated that any number of lasers can be used as desired. For example, a separate laser may be used for each filler wire used in the system. In addition, the area of focus of the laser 220 may be adjustable such that the laser beam 210 heats more than one filler wire.

In FIGS. 1 and 4 the weld puddle laser power supply 130, hot wire laser power supply 230, hot wire resistance power supply 170, and sensing and control unit 195 are shown separately for clarity. However, in embodiments of the invention these components can be made integral into a single welding system. Aspects of the present invention do not require the individually discussed components above to be maintained as separately physical units or stand alone structures.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A hot-wire system, the system comprising:
a first laser beam system which directs a first laser beam at a surface of at least one workpiece to create a molten puddle on said surface;
a wire feeder which advances a consumable to said molten puddle so that said consumable contacts said molten puddle;
a power supply which outputs a heating signal and said heating signal is directed to said consumable to heat said consumable prior to said consumable entering said puddle;
a second laser beam system which directs a second laser beam at said consumable prior to said consumable entering said puddle; and
a controller which controls an output of each of said power supply and said second laser beam system,
wherein said controller monitors at least one of a voltage at, current through, resistance of, and temperature of said consumable and controls an output of at least one of said second laser beam system and said power supply based on said monitoring so that said consumable melts in said molten puddle without generation of an arc between said consumable and said molten puddle.

2. The system of claim 1, wherein said second laser beam system provides more than 50% of energy needed to melt said consumable.

3. The system of claim 1, wherein said power supply provides more than 50% of energy needed to melt said consumable.

4. The system of claim 1, wherein said controller controls said output of at least said second laser beam system and said controlling said output of said second laser beam system comprises adjusting at least one of a cross-sectional shape and a focus of said second laser beam at a point of impact on said consumable.

5. The system of claim 4, wherein said controller adjusts at least a width of said cross-sectional shape such that said width is in a range of 50% to 90% of a diameter of said consumable.

6. A hot-wire system, the system comprising:
- a laser beam system which directs a first laser beam at a surface of at least one workpiece to create a molten puddle on said surface and a second laser beam at a consumable prior to said consumable entering said molten puddle, said first laser beam and said second laser beam originating from a common source laser;
- a wire feeder which advances said consumable to said molten puddle so that said consumable contacts said molten puddle;
- a power supply which outputs a heating signal and said heating signal is directed to said consumable to heat said consumable prior to said consumable entering said puddle; and
- a controller which controls an output of each of said power supply and said laser beam system,
- wherein said controller monitors at least one of a voltage at, current through, resistance of, and temperature of said consumable and controls an output of at least one of said laser beam system and said power supply based on said monitoring so that said consumable melts in said molten puddle without generation of an arc between said consumable and said molten puddle.

7. The system of claim 6, wherein said laser beam system comprises a beam splitter that splits a laser beam from said common source laser into said first laser beam and said second laser beam, or a laser beam oscillator that controls said common source laser such that an output of said laser beam system oscillates between said first laser beam and said second laser beam.

8. The system of claim 6, wherein said laser beam system provides more than 50% of energy needed to melt said consumable.

9. The system of claim 6, wherein said power supply provides more than 50% of energy needed to melt said consumable.

10. The system of claim 6, wherein said controller controls said output of at least said laser beam system and said controlling said output of said laser beam system comprises adjusting at least one of a cross-sectional shape and a focus of said second laser beam at a point of impact on said consumable.

11. A method of heating a consumable, the method comprising:
- directing a first laser beam at a surface of at least one workpiece to create a molten puddle on said surface;
- advancing a consumable to said molten puddle so that said consumable contacts said molten puddle;
- directing a heating signal to said consumable to heat said consumable prior to said consumable entering said puddle;
- directing a second laser beam at said consumable prior to said consumable entering said puddle;
- monitoring at least one of a voltage at, current through, resistance of, and temperature of said consumable; and
- controlling a power of at least one of said second laser beam and said heating signal based on said monitoring so that said consumable melts in said molten puddle without generation of an arc between said consumable and said molten puddle.

12. The method of claim 11, wherein said second laser beam provides more than 50% of energy needed to melt said consumable.

13. The method of claim 11, wherein said heating signal provides more than 50% of energy needed to melt said consumable.

14. The method of claim 11, wherein said power of said second laser beam is controlled and said controlling said power of said second laser beam comprises adjusting at least one of a cross-sectional shape and a focus of said second laser beam at a point of impact on said consumable.

15. The method of claim 14, wherein at least a width of said cross-sectional shape is adjusted such that said width is in a range of 50% to 90% of a diameter of said consumable.

16. A method of heating a consumable, the method comprising:
- controlling a laser beam system to direct a first laser beam at a surface of at least one workpiece to create a molten puddle on said surface and a second laser beam at a consumable prior to said consumable entering said molten puddle, said first laser beam and said second laser beam originating from a common source laser;
- advancing said consumable to said molten puddle so that said consumable contacts said molten puddle;
- directing a heating signal to said consumable to heat said consumable prior to said consumable entering said puddle;
- monitoring at least one of a voltage at, current through, resistance of, and temperature of said consumable; and
- controlling a power of said second laser beam and said heating signal based on said monitoring so that said consumable melts in said molten puddle without generation of an arc between said consumable and said molten puddle.

17. The method of claim 16, wherein said laser beam system comprises a beam splitter that splits a laser beam from said common source laser into said first laser beam and said second laser beam, or a laser beam oscillator that controls said common source laser such that an output of said laser beam system oscillates between said first laser beam and said second laser beam.

18. The method of claim 16, wherein said second laser beam provides more than 50% of energy needed to melt said consumable.

19. The method of claim 16, wherein said heating signal provides more than 50% of energy needed to melt said consumable.

20. The method of claim 16, wherein said power of said second laser beam is controlled and said controlling said power of said second laser beam comprises adjusting at least one of a cross-sectional shape and a focus of said second laser beam at a point of impact on said consumable.

* * * * *